UNITED STATES PATENT OFFICE.

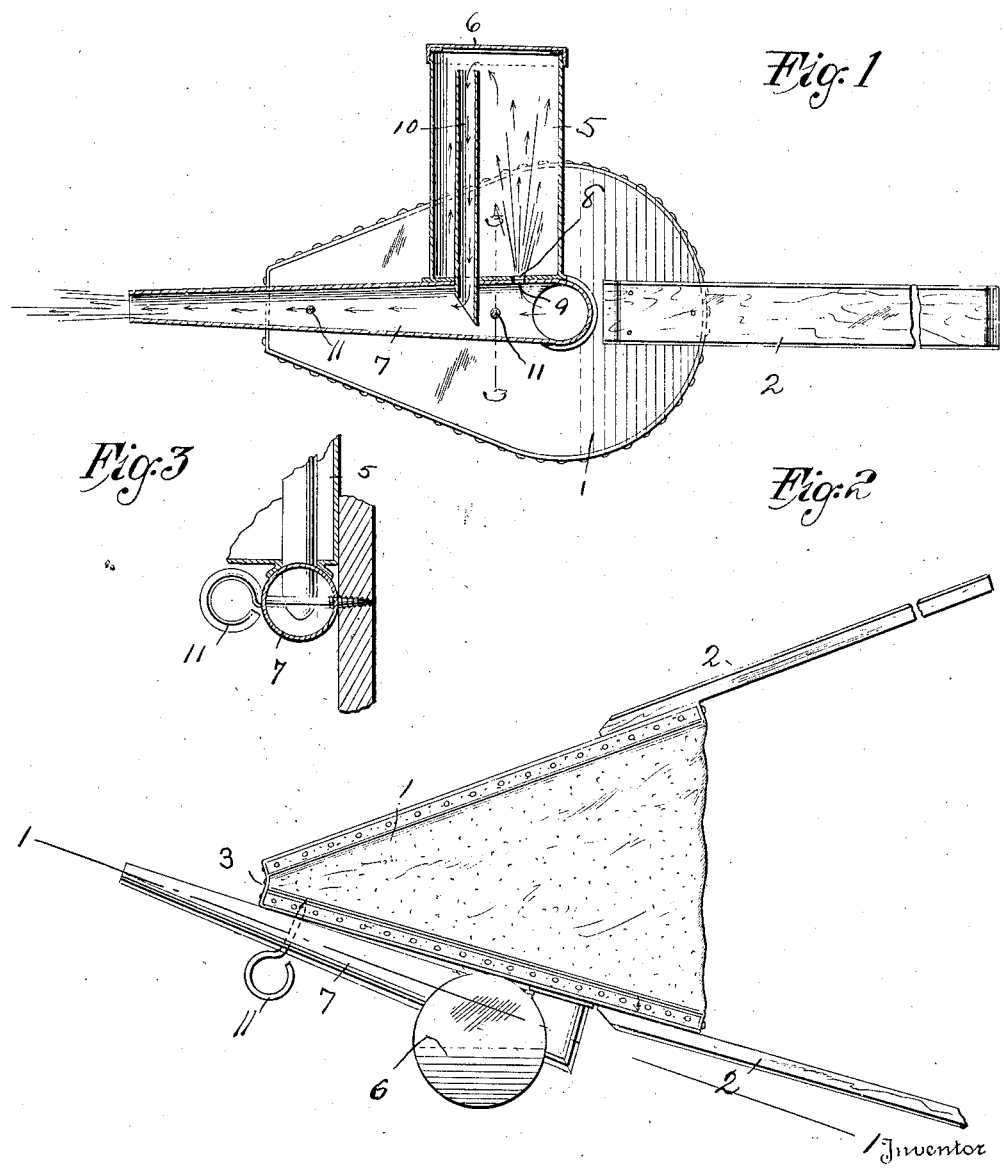

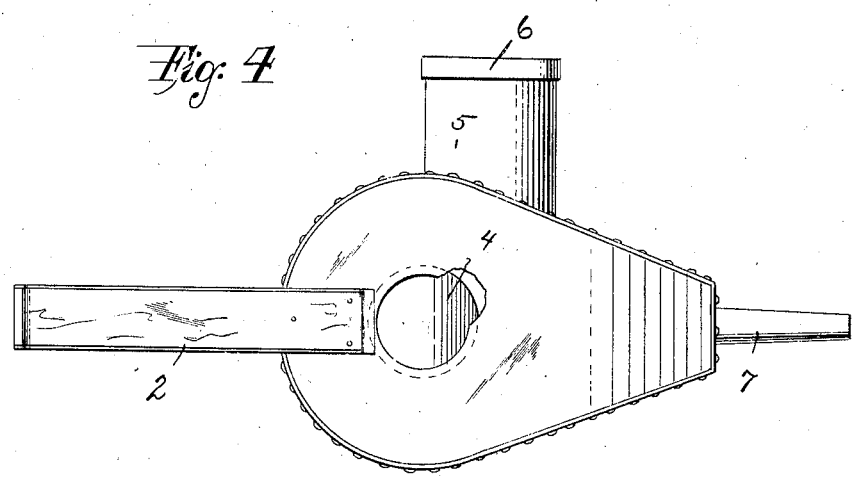

SAMUEL D. IRWIN, OF FLOYDADA, TEXAS.

POWDER-SPRAYER.

1,360,642.     Specification of Letters Patent.     Patented Nov. 30, 1920.

Application filed December 15, 1919. Serial No. 345,047.

*To all whom it may concern:*

Be it known that I, SAMUEL D. IRWIN, a citizen of the United States, residing at Floydada, in the county of Floyd and State of Texas, have invented certain new and useful Improvements in Powder-Sprayers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for spraying insect powders upon animals, plants, etc., and consists of a simple and efficient device of this nature having various details of construction, combination and arrangement of parts which will be hereinafter fully described, shown in the accompanying drawings and then specifically defined in the appended claim.

My invention is illustrated in the accompanying drawings which, with the numerals of reference marked thereon, form a part of this application, and in which:

Figure 1 is a sectional view through the sprayer along the line 1—1 of Fig. 2.

Fig. 2 is a cross sectional view on the line 2—2 of Fig. 2.

Fig. 3 is a cross sectional view.

Fig. 4 is a side view of the sprayer, showing flap valve.

Reference now being had to the details of the drawings by numerals:

1 designates a bellows with two handles 2, the two sides being hinged together at 3, and 4 designates a flap valve regulating an opening in the bellows, through which opening air is drawn into same. A receptacle 5 receives the powder, and 6 is a closure to the receptacle. Mounted on one side of the bellows is a tapering pipe 7, one end of said pipe or nozzle being angled, and communicating with the interior of the bellows at a location opposite the flap valve. Said receptacle 5 has an aperture 8 in the bottom which is in registration with an aperture 9 in the wall of the nozzle, and 10 is an open-ended tube within the receptacle and which extends through a hole in the bottom of said receptacle and the wall of the nozzle, the inner end of the tube being beveled and forming an abutment surface to cause a large portion of the air drawn into the bellows to be deflected into the receptacle, as shown by the arrows in Fig. 1 of the drawings. Said nozzle or pipe 7 is held to the side of the bellows by means of screw eyes 11, which are shown clearly in the detail sectional view, Fig. 3, of the drawings. Said screw-eyes also afford a means whereby the entire device may be hung on a hook or nail on the wall of a barn or a room in a dwelling house.

In operation, when the handles of the bellows are operated, air is drawn into same through the flap valved aperture in the side, and when the handles are pushed together, the air within the bellows is forced out through the nozzle, a portion of the air being deflected from its direct course through the holes 8 and 9 into the receptacle in which the insect powder is placed, and the suction produced therein will cause the powder to be carried through with the current and make exit through the tube.

What I claim to be new is:

A device for spraying insect powder, comprising the combination of a bellows, a nozzle communicating therewith, a screw-eye passing through said nozzle and into one of the side walls of said bellows for connecting the nozzle to said bellows, and affording means for suspending said device upon a support, such as a hook or nail, a powder receptacle supported by said nozzle and communicating therewith, and a powder exit tube communicating with the said receptacle and with said nozzle.

In testimony whereof I hereunto affix my signature.

SAMUEL D. IRWIN.